United States Patent Office 2,890,101
Patented June 9, 1959

2,890,101

RECOVERY OF AMMONIUM BISULPHATE FROM THE DISTILLATION RESIDUES FROM THE MANUFACTURE OF ACRYLIC ACIDS AND THEIR ESTERS

Marcel Borrel, Francis Weiss, and Bernard Chatelin, Pierre-Benite, France, assignors to Societe d'Electro-Chimie d'Electro-Metallurgie et des Acieries Electriques d'Ugine, Paris, France, a corporation of France Application July 17, 1956, Serial No. 598,351

Claims priority, application France July 22, 1955

3 Claims. (Cl. 23—119)

The present invention relates to improvements in the manufacture of acrylic acids or esters. These improvements are more particularly directed to a method of recovering the constituents of the residue resulting from the manufacture of these acids or esters. By the term acids and esters, there is meant in this case the various acids and esters which contain an acrylic group

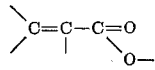

of which the free valences are saturated by hydrogen or by any other radicals, that is to say acrylic acid $CH_2=CH-COOH$ and its esters and also their higher homologues.

For sulphuric acid hydrolysis at high temperature of the nitriles or the corresponding cyanhydrins, with a view to obtaining such esters or acids, it is in theory only necessary to use half a molecule of sulphuric acid per molecule of nitrile or of cyanhydrin. It is however known that if a satisfactory efficiency is to be obtained, it is necessary to work in the presence of an excess of sulphuric acid, which means in practice that 1 to 2 molecules of sulphuric acid must be used per molecule of nitrile or of cyanhydrin.

In the known method, the acrylic acids or esters formed are separated from the reaction mixture by decantation, or more frequently by distillation. The residue is composed of a sulphuric solution of ammonium sulphate which is produced by the hydrolysis, and the formula of which can be written $(NH_4)_2SO_4$, $H_2SO_4$ or $NH_4HSO_4$; this solution contains in addition, in more or less substantial proportions, water, acids or esters which have not been quantitatively separated, re-usable intermediate products, heavier sub-products which are more or less coloured, together with the polymerisation inhibitors which have been used. In the manufacture of esters, the residue may contain in addition a certain quantity of alcohol employed for the esterification.

When this is possible, the residue is at the present time very often directly thrown away, but attempts have been made sometimes to re-employ at least a part of this residue, for example by neutralising it with ammonia in order to form neutral ammonium sulphate which is then crystallised. A utilisation treatment of the residues will however be of greater interest if it is advantageous from the economic point of view, which is not generally the case with the known methods: on the one hand there is in fact obtained a sulphate of ammonium which is coloured and charged with impurities which interfere with its crystallisation, and this gives it a poor commercial value, while on the other hand, under the most favourable conditions, only the value of the sulphuric acid and the ammonia contained in it are recovered, to the exclusion of the organic products, which are lost.

The present invention proposes to eliminate the drawbacks of the known methods by permitting of an easy and profitable recovery of the greater part of the residues derived, in the said methods, from the manufacture of acrylic and methacrylic acids or esters by sulphuric hydrolysis of the corresponding nitriles or cyanhydrins. To this end, the method in accordance with the present invention consists essentially in that the acid ammonium sulphate contained in said residues is crystallised-out by cooling, the crystals are separated from the mother solution containing sulphuric acid in excess and almost the whole of the organic constituents of the initial residues, the heavy organic products which are more or less carbonised are eliminated either before, after or both before and after the separation of the crystals of said acid ammonium sulphate, and that the acid solution obtained is re-introduced into the reaction vessel, after re-concentration, if necessary.

The crystallisation may be carried out at low temperature, but it is in general preferable to cool only to a temperature in the vicinity of the ambient temperature, and comprised for example between about 10° and 30° C.

The separation of the crystals may be carried out for example by filtration or by pressing.

The elimination of the more or less carbonised heavy organic products is effected by adsorbing them in the hot or cold state, continuously or non-continuously, on an adsorbent earth or carbon. Activated carbon is well-suited to this purpose. The solution to be purified may be passed through a bed of adsorbent material or the latter may be mixed with the solution and the suspension is then passed through a filter in which the adsorbent material is retained.

It is also possible, preferably before the crystallisation of the acid ammonium sulphate, to subject the residue to evaporation under reduced pressure, or even under vacuum. Such an evaporation process simultaneously eliminates on the one hand a part of the water of the residue (the subsequent crystallisation then enabling a larger proportion of the salt present to be separated, and the acid collected after crystallisation thus being at a higher concentration) and on the other hand, the volatile organic products, which are then passed either to esterification or to the raw acrylic esters produced.

If the purified solution contains a lower concentration of sulphuric acid than that which is required at the input of the reaction vessel, concentrated sulphuric acid or oleum is added to it.

Finally, in particular during the manufacture of the methacrylic acids or esters

the solution derived from the hydrolysis and/or from the esterification may be subjected before cooling to a treatment under reduced pressure; by this means, the organic products which can again be utilised in the reaction (intermediate products, methacrylic acid and/or methacrylic esters and/or alcohols) are separated and these are then directly re-cycled to the hydrolysis stage.

The crystals of acid sulphate or bi-sulphate of ammonium obtained when the method of the present invention is applied, may be used either in the solid form or after being again dissolved, for the manufacture of neutral sulphate of ammonium in a neutralisation and evaporation apparatus of any type normally used for the direct manufacture of this salt. The salt obtained under these conditions is practically white and has a good commercial value.

The acid solution obtained from the separation of the ammonium acid sulphate crystals contains in solution, in addition to sulphuric acid and a certain proportion of the ammonium acid sulphate initially present, all the organic products (with the exception of the volatile products in the case in which the residues have been subjected to evaporation prior to the crystallisation). The proportion of ammonium acid sulphate remaining in solution will vary with the initial concentration of ammonium acid sulphate in the solution subjected to crystallisation, and with the temperature of crystallisation.

The organic products present in the residues are in part constituted by usable products, in particular acrylic esters or acids and intermediate compounds between these esters and these acids and the initial materials employed; they also comprise heavier sub-products which are constituted in part by non-volatile carbonised impurities.

Before or after treating the residue with an adsorbent material to remove the carbonised heavy organic products, it may be an advantage to take-off a part of the acid solution and to introduce it into the crystalliser in order to make the crystalline magma more fluid and to facilitate the filtration of the crystals. It is necessary to observe that the part of the solution thus added has the same concentrations of sulphuric acids and of ammonium sulphate as the mother solution of the crystals, and that its introduction does not therefore modify the solution-crystals equilibrium.

The method in accordance with the invention results in a large number of valuable advantages which are detailed below:

First of all, it enables sulphate which is practically pure and of good commercial value to be obtained in a particularly simple and economical manner, without the addition of ammonia, which corresponds to a recovery of the corresponding sulphuric acid and ammonia.

On the other hand, by re-cycling the acid solution purified of carbonised heavy organic products, an economy of sulphuric acid is obtained together with an improvement in the output of acrylic acids or esters, as a result of the simultaneous re-cycling of those parts of the products of the reaction and the intermediate products which remain dissolved in the liquid phase after the separation of the sulphate;

The manufacture is simplified, since as the materials contained in the residues are recovered (except for the carbonised heavy organic products), a greater quantity of residues can be permitted, and the reaction need not therefore be carried so far, especially by working at a lower reaction temperature which enables the proportion of the carbonised heavy organic products of the residue to be reduced. At the same time, the corrosion of the apparatus is also reduced;

The quantity of polymerisation inhibitors consumed is reduced. This represents a large economy, since the usual kinds of inhibitor, such as hydroquinone or methylene blue are costly products which must often be used in large quantities. In the present method, these inhibitors remain almost entirely in the liquid phase after the separation of the acid ammonium sulphate, and are thus re-cycled with that phase;

When acrylic esters are manufactured, there is a reduction in the consumption of the corresponding alcohols, of which a part always remains in the sulphuric residues, since the present method enables the said alcohols to be re-cycled.

Finally, and contrary to what might have been feared, the re-cycling of the filtered acid solution causes no disturbance in the reaction of hydrolysis, in spite of the presence of an appreciable quantity of acid ammonium sulphate in solution.

In the case of the manufacture of methacrylic acid or esters

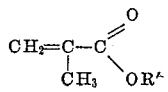

the hydrolysis takes place in the presence of 100% sulphuric acid. For this manufacture, the re-concentration of the re-cycled acid solution by the addition of sulphuric acid or oleum, by reason of the quantity of water present in the purified solution, gives a quantity of acid at 100% greater than that which should be introduced into the process of hydrolysis. In this case, the total recovery of the sulphuric acid thus involves the production of a quantity of sulphuric acid of the necessary concentration, which is greater than that which can be employed in the process.

The treatment under reduced pressure or preferably under vacuum thus enables the consumption of nitrile or cyanhydrin, and of alcohol, as the case may be, to be reduced. On the other hand, after the elimination of the crystals of acid ammonium sulphate, and before treatment on adsorbent earth or carbon, the acid solution is partly re-concentrated by heat in the presence of a small quantity of an oxidising agent such as nitric acid. The quantity of sulphuric acid at 100% is thus limited to that required and obtained by the later concentration by means of oleum, and at least a part of the heavy organic products, which contaminate the acid solution and which could be a source of trouble during its later re-cycling, is heated at the same time to carbonise it. The materials thus carbonised by the combined action of heat and the oxidising agent are then removed by passing over adsorbent earth.

When it is carried into effect under the conditions described above, the method thus permits of the complete recovery of the materials contained in the acid residue resulting from the hydrolysis and/or from the esterification process. The light organic materials which are dissolved in this acid residue (methacrylic acid or esters, intermediate products, alcohol in excess) are recovered by means of evaporation under reduced pressure, and may be led back to the hydrolysis or esterification stages or mixed with the condensed products at the outlet of the esterification stage. A cooling process enables about 80% of the ammonia and two-thirds of the sulphuric acid contained in the residue to be separated-out in the form of crystals of acid ammonium sulphate. The non-crystallised sulphuric acid and ammonia may be put back into the circuit by re-cycling, so that there is collected in the form of acid ammonium sulphate a quantity of ammonia which corresponds to that which has been produced.

The re-cycling of the whole of the residue into the manufacture itself of the methacrylic acid and esters involves the necessity of re-concentrating it up to 100% by heating and/or by the addition of sulphuric acid or of oleum. This re-concentration may be considered as costly; without departing from the scope of the present invention, this re-concentration may be limited to a value which permits of the re-use of the partly re-concentrated acid solution in any other manufacturing process. The re-use of this acid solution in the manufacture of acrylic acid or esters, which only requires sulphuric acid at a concentration of 78%, is especially fortunate, since it enables not only the sulphuric acid but also the acid ammonium sulphate content to be recovered.

The method in conformity with the present invention may be carried into effect by means of apparatus which is simple and known per se.

The invention will now be explained in more detail in the description and in the examples of its embodiment given below, reference being made to the appended drawings, in which:

Fig. 1 shows a diagram of a method in accordance with the invention as applied to the manufacture of acrylic acids or esters. The esterification stage which does not exist for the production of acrylic acids has been enclosed in a rectangle of dotted lines. In the same way, dotted lines have been used to show the positions "before cooling and/or after separation of the crystals," in which may be located the elimination of the heavy organic product which are more or less carbonised. The re-concentration by sulphuric acid or oleum, which is not always necessary, has also been shown in dotted lines.

Fig. 2 shows an arrangement which can be used for the manufacture of ethyl acrylate

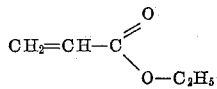

Figure 1:
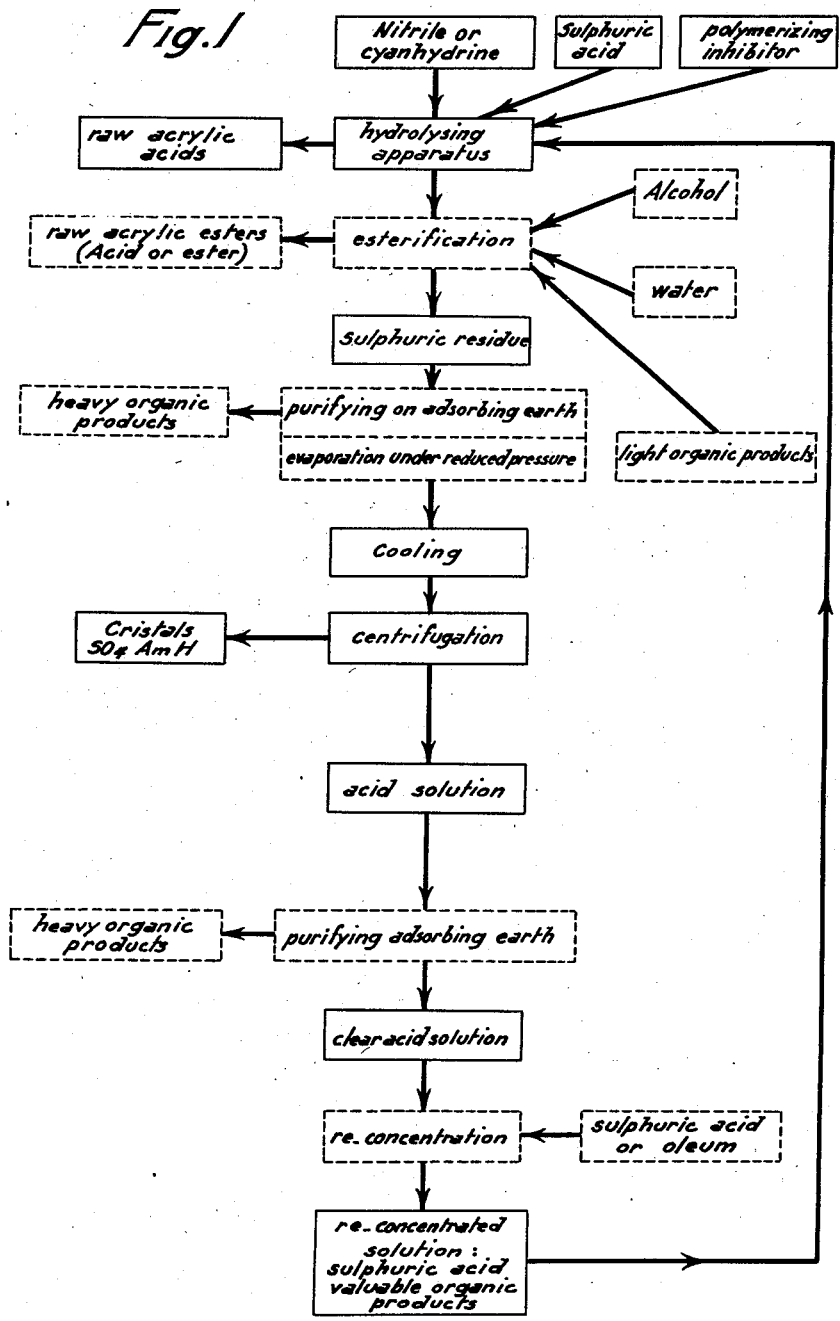
Figure 2:
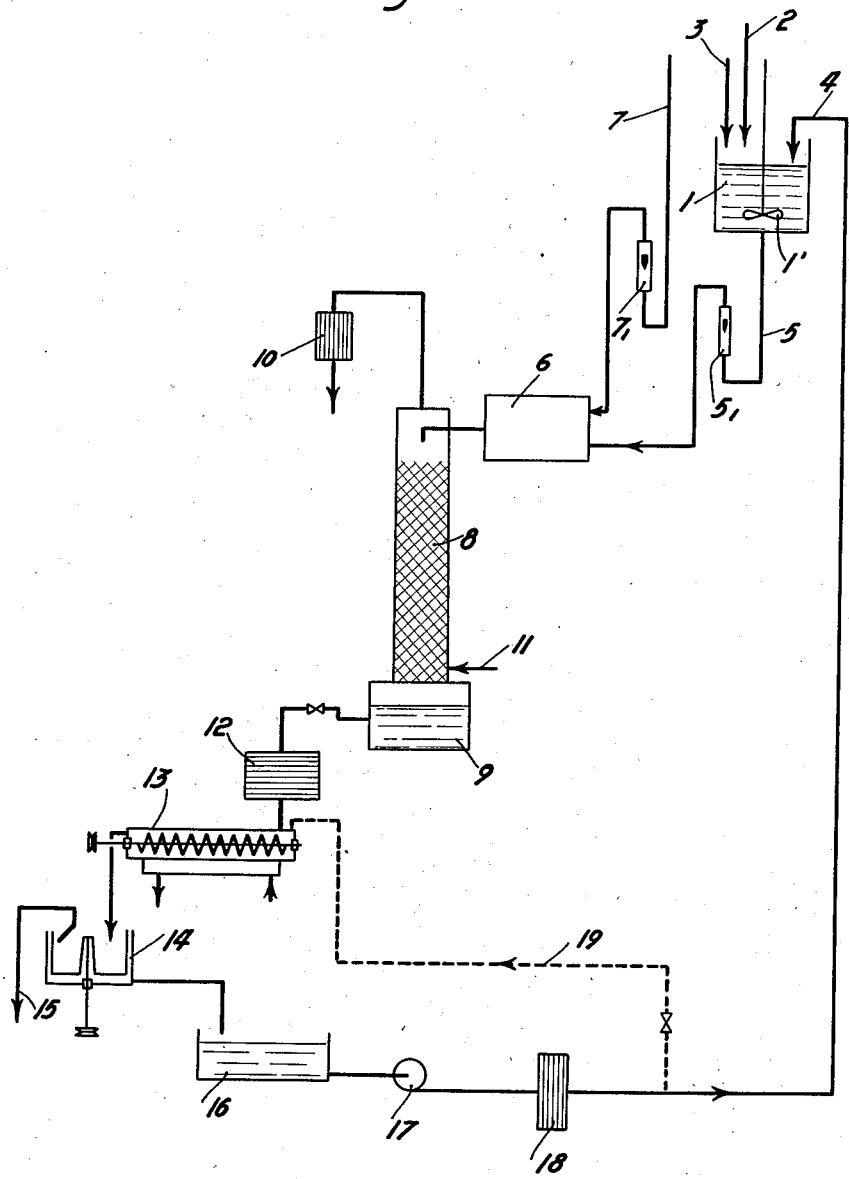
Figure 3:
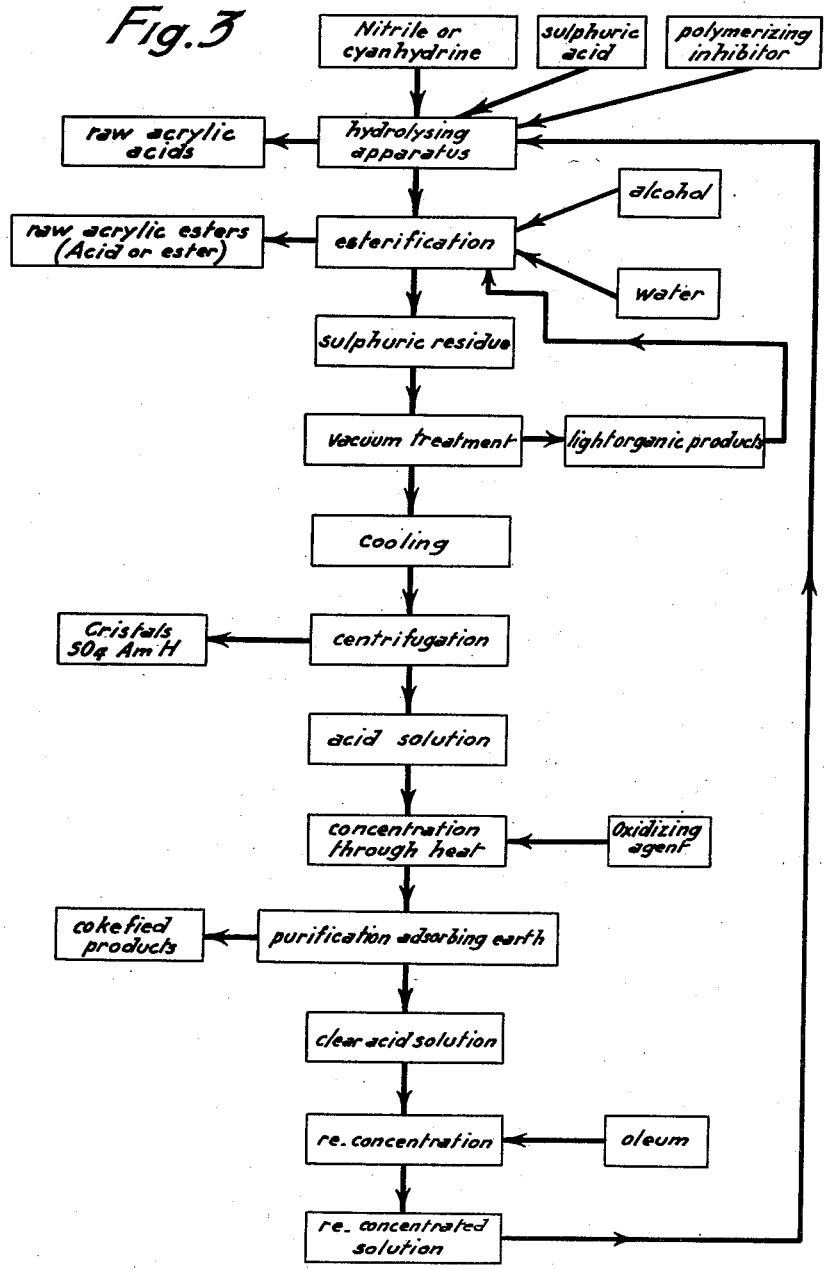
Fig. 3 is a working diagram of the operations applied to the methacrylic acids and esters.

In the arrangement shown in Fig. 2, there is introduced into a vat 1, provided with an agitator 1', new sulphuric acid supplied through the piping system 2, the polymerisation inhibitors being supplied through the pipes 3. A conduit system 4 brings into the vat 1 the re-cycled acid, the mixture of which with the new acid is homogenised by the agitator 1'. The concentration of the acid solution is adjusted to suitable value by variation of the quantity and the concentration, as may be required, of the new acid. A piping system 5 which passes through a flow-meter $5_1$, leads the acid into a hydrolysis reactor 6 into which there is introduced on the other hand, through the conduit system 7 and the flow-meter $7_1$, the acrylic nitrile to be treated. From the reactor 6, the hydrolysed mixture is led into a column 8 which is arranged above a boiler 9, and at the head of which is mounted a condenser 10. Into the foot of the column 8, the ethyl alcohol is introduced which is intended in this case to be esterified to acrylic ester; at the same time, there may be introduced, if so required, at 11, a certain suitable quantity of additional water. The ester formed (ethyl acrylate) passes out from the top of the column 8 into the condenser 10 in which it is condensed. The acid residue flows out of the boiler 9 through the filter 12 into a crystallising vessel 13, constituted by a trough provided with a cooling jacket and a screw conveyor, and in which the acid ammonium sulphate is crystallised. From the crystalliser, the mixture of crystals and liquid is led into a centrifuge 14, from which is drawn, at 15, the ammonium acid sulphate and an acid solution which is more or less coloured and which flows to a vessel 16. The solution is taken from the vessel 16 by a pump 17 which passes it through a filter 18 to the mixing vat 1. In the vessel 16, a small quantity of activated earth may be added to the liquid with the object of assisting the filtration and of adsorbing the carbonised heavy organic products. A conduit 19 enables a part of the acid solution to be re-cycled after its filtration at 18, to the crystalliser 13. The remainder of the acid solution passes through a conduit 4 to the vat 1.

Figure 4:
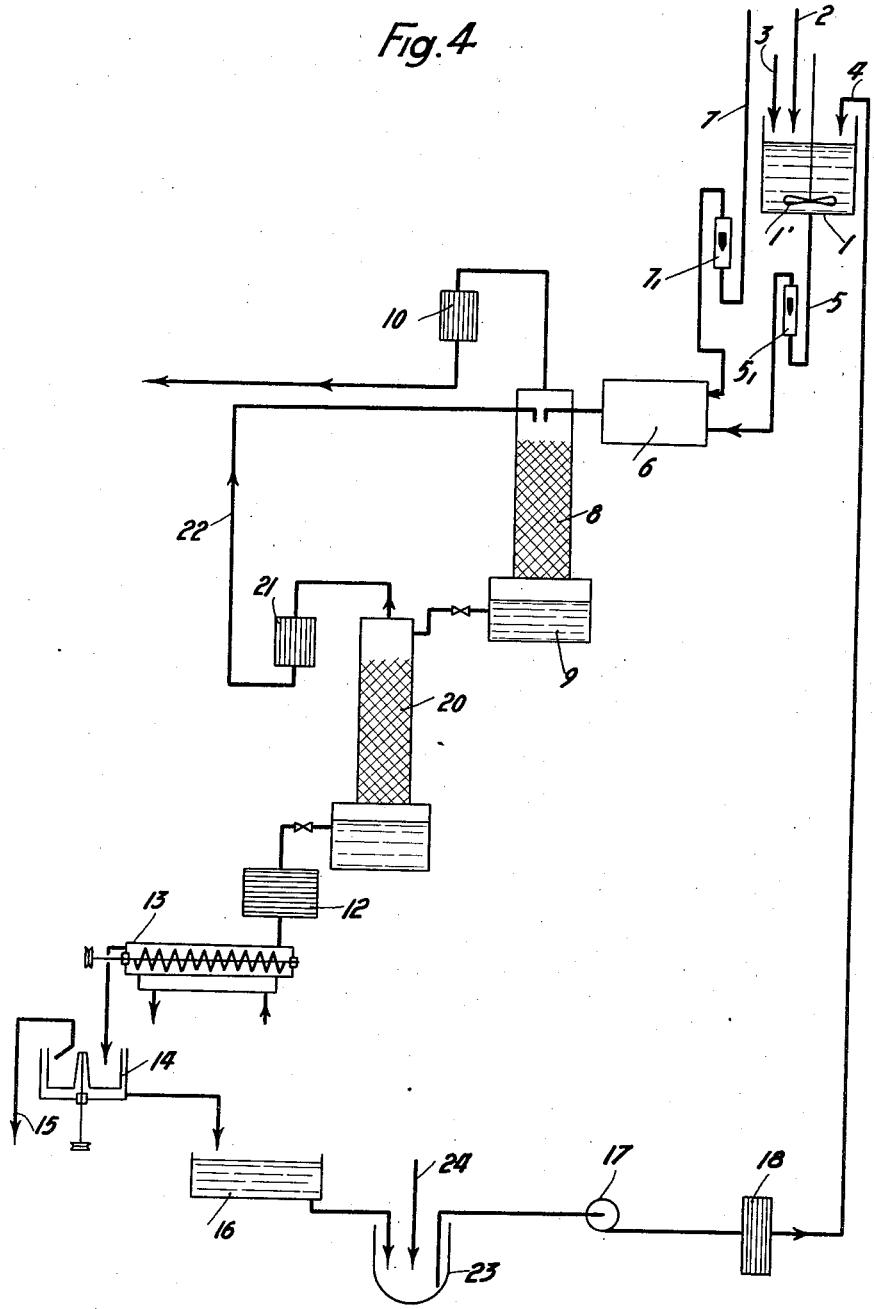
Fig. 4 shows an arrangement used for the application of the method.

In Fig. 4, the parts of the apparatus which are common to the arrangements of Figs. 2 and 4, have been given the same reference numbers. For the manufacture of a methacrylic ester, the acid residue from the esterification column 8 passes first of all into a column 20 under vacuum, in which the volatile products are extracted which, after condensation at 21, are re-cycled through the conduit 22, for example to the column 8. The remaining solution is passed in succession through a filter 12, into the crystalliser 13, into the water-extraction centrifuge device 14, into the vessel 16 and into a concentration apparatus 23, heated for example by a bare flame, in which there is introduced at 24 an oxidising agent such as nitric acid, for example. The resulting solution, which is in part re-concentrated and in which, by the joint action of heat and the oxidising agent, the heavy organic products have been carbonised, is taken by the pump 17 and is passed through the filter 18 from which it is returned to the vat 1 through the conduit 4, in which vat it is brought back to a concentration of 100% of sulphuric acid by the addition of oleum introduced at 2.

In the case of the manufacture of ethyl acrylate, the operations were carried out as follows with the arrangement shown in Fig. 2.

The hydrolysis reactor 6 was continuously supplied with: 21.2 kg. per hour of acrylic nitrile introduced at 7; 75.4 kg. per hour of sulphuric acid at 78% concentration, and 37 g. per hour of methylene blue, from the vat 1 through pipe 5.

The hydrolised mixture from reactor 6 was then subjected to a continuous esterification process by the introduction at 11 of 46 kg. per hour of ethanol and 10.8 kg. per hour of water, into the unit comprised by the boiler 9 and the esterification column 8 with filling elements, at the head of which was introduced the hydrolised mixture. There were obtained 72.4 kg. of ethyl acrylate, which corresponds to an overall efficiency of 92.5%, the ethyl acrylate having been condensed at 10. At the same time, the sulphuric residue was continuously drawn-off from the boiler 9 at a rate of 81 kg. per hour. The liquor, which was brown in colour, was filtered at 12 and was then cooled to +15° C. in the crystalliser 13 and the crystals formed were freed from liquid at 14: there was obtained at the outlet 15, 40.5 kg. per hour of damp crystals containing 93.2% of bisulphate of ammonium and 3.7% of free sulphuric acid.

The residuary acid, in an amount of 39.7 kg. per hour, had the following composition:

| | Percent |
|---|---|
| $H_2SO_4$ | 45.4 |
| $NH_4HSO_4$ | 20.7 |
| Organic materials (in percent of C) | 2.0 |
| Water | 31.9 |

This acid was conveyed after filtration at 18 to the vat 1, in which, by mixture with fresh acid or with oleum (introduced at 2), it was brought up to a concentration of 78% of sulphuric acid, and it was then used to effect the hydrolysis, in which it formed a part of the acid introduced. The results were absolutely similar to those obtained with new acid only, but the efficiency of production of acrylic ester was increased to 97.5–98%; on the other hand, the bisulphate extracted by crystallisation represented exactly the theoretical quantity produced, since the re-cycling had added the quantity of sulphate necessary for the saturation of the residuary acid. It is thus clearly shown that the sulphate added, in the form dissolved in the acid, to the mixture passed into the hydrolysis stage does not interfere in any way with the reaction.

These results remained unchanged after prolonged working with re-cycling: the efficiency of acrylate production was always 97.5%, and the hourly production of crystallized bisulphate (wet) was 49 kg., analysing 93.8% of bisulphate and 4% of sulphuric acid. The residuary acid had the following composition:

| | Percent |
|---|---|
| $H_2SO_4$ | 46.4 |
| $NH_4HSO_4$ | 21.7 |
| Organic material (in percent of C) | 2.25 |
| Water to make up 100%. | |

This residuary acid could thus always be used to supply the subsequent manufactures. A small quantity of inhibitor was destroyed, but it was found that it was only necessary to add to it a maximum quantity of about 10% of the total quantity to compensate for the losses: there is thus in fact obtained a considerable economy in these expensive products.

With the arrangement shown in Fig. 4, the hydrolysis apparatus 6 was supplied, for the manufacturer of methyl methacrylate, with: 20.4 kg. per hour of acetone cyanhydrin at 98% concentration; 34.6 kg. per hour of sulphuric acid at 100% concentration; 37 grams per hour of methylene blue.

The hydrolised mixture was subjected to an esterification process in the column 8 by the addition of 22.6 kg. per hour of methanol and 12.7 kg. per hour of water. At the top of the column 8, there was collected, after passing into the condenser 10, 37.5 kg. per hour of raw methyl methacrylate, which corresponds to an efficiency of 92%. From the boiler 9 there was passed out 49.5 kg. per hour of a sulphuric residue, composed essentially of 41.4% of pure sulphuric acid, 30.7% of ammonium bisulphate, the remainder being water, non-converted methanol and carbonised materials.

This residue was introduced, again continuously, into the evaporation column 20 which was heated to 130° C. and kept under a reduced pressure of 100 mm. of mercury. The products (methacrylic acid, methyl methacrylate and methanol) thus vaporised from the solution and which represented 1.5% of methyl methacrylate, were condensed at 21.

The acid residue, now freed from volatile substances, was then led to the crystalliser 13, in which it was cooled. The acid magma obtained in the crystalliser was passed into the centrifuge 14. From the centrifuge, there was obtained on the one hand 22.8 kg. per hour of crystals composed of 93% of bisulphate of ammonium and only containing 3% of free sulphuric acid, and on the other hand 22.2 kg. per hour of an acid solution containing 63% of free sulphuric acid and 14.9% of ammonium bisulphate, the remainder being constituted by water and heavy organic products.

This solution was then heated with a naked fire in the heater 23 to a temperature of 200 to 220° C., and during this heating, there was added to it 20 cu. cm. of nitric acid at 36° Baumé per litre of solution in order to facilitate the carbonising of the heavy organic products which it contained. The contaminated acid solution obtained was mixed with a little adsorbent earth and then filtered at 18. There were obtained 180 kg. per hour of a clear, slightly coloured acid solution containing 70.3% of sulphuric acid which was re-cycled to the hydrolysis reactor 6, after mixing in the vat 1 with an addition of oleum which brought its concentration up to 100% of $H_2SO_4$.

What we claim is:

1. In a method of recovering and utilizing the greater part of the constituents of the residue derived from a process of manufacture of acrylic acid, methacrylic acid and their esters by sulphuric acid hydrolysis of the corresponding nitriles and cyanhydrins in the presence of a polymerization inhibitor, said residue being a sulphuric acid solution of ammonium acid sulphate and containing in solution, unreacted constituents, carbonized heavy organic products and polymerization inhibitor, the steps consisting of cooling said residue to crystallize acid ammonium sulphate, separating the crystallized acid ammonium sulphate from its mother solution containing sulphuric acid in excess and almost the whole of said unreacted constituents, carbonized heavy organic products and polymerization inhibitor, removing the carbonized heavy organic products from the acid solution by adsorbing them on an adsorbent material, and utilizing the acid solution thus obtained in the sulphuric acid hydrolysis of a further quantity of starting material of the group consisting of acrylic nitriles and cyanhydrins.

2. In a method of recovering and utilizing the greater part of the constituents of the residue derived from a process of manufacture of acrylic acid, methacrylic acid and their esters by sulphuric acid hydrolysis of the corresponding nitriles and cyanhydrins in the presence of a polymerization inhibitor, said residue being a solution consisting essentially of free sulphuric acid, acid ammonium sulphate, low boiling organic compounds, carbonized high boiling organic compounds and polymerization inhibitor, the steps consisting of separating the low boiling organic compounds from said residue by distillation and recycling them in said process of manufacture, cooling the liquid residue to crystallize acid ammonium sulphate, separating the crystallized acid ammonium sulphate from the remaining liquid residue, separating the carbonized high boiling organic compounds from the remaining liquid residue by adsorbing them on an adsorbent material, and recycling the acid solution thus obtained in said process of manufacture.

3. In a method of recovering and utilizing the greater part of the constituents of the residue derived from a process of manufacture of acrylic acid, methacrylic acid and their esters by sulphuric acid hydrolysis of the corresponding nitriles and cyanhydrins in the presence of a polymerization inhibitor, said residue being a solution consisting essentially of free sulphuric acid, acid ammonium sulphate, low boiling organic compounds, high boiling organic compounds and polymerization inhibitor, the steps consisting of separating the low boiling organic compounds from said residue by distillation and recycling them in said process of manufacture, cooling the liquid residue to crystallize acid ammonium sulphate, separating the crystallized acid ammonium sulphate from the remaining liquid residue, heating the remaining liquid residue under oxidizing conditions to drive off water and to carbonize high boiling organic compounds, separating the carbonized high boiling organic compounds from the remaining liquid residue by adsorbing them on an adsorbent material, and recycling the acid solution thus obtained in said process of manufacture.

References Cited in the file of this patent

UNITED STATES PATENTS

| | | |
|---|---|---|
| 1,998,413 | Reppe et al. | Apr. 16, 1935 |
| 2,416,756 | Jilk | Mar. 4, 1947 |
| 2,586,729 | Schmidl | Feb. 29, 1952 |
| 2,666,782 | Brockway | Jan. 19, 1954 |
| 2,783,271 | Eck et al. | Feb. 26, 1957 |
| 2,786,739 | Eck et al. | Mar. 26, 1957 |